United States Patent

[11] 3,620,280

| [72] | Inventor | Alfred Marzocchi<br>Cumberland, R.I. |
|---|---|---|
| [21] | Appl. No. | 721,688 |
| [22] | Filed | Apr. 16, 1968 |
| [45] | Patented | Nov. 16, 1971 |
| [73] | Assignee | Owens-Corning Fiberglas Corporation |

[54] MULTIFILAMENT REINFORCEMENT YARNS AND ARTICLES CONTAINING SAME
15 Claims, 5 Drawing Figs.

[52] U.S. Cl. .................................................. 152/359,
57/140 BY, 57/140 G, 57/144, 57/162
[51] Int. Cl. .................................................. B60c 9/02,
D02g 3/36, D02g 3/48
[50] Field of Search .......................................... 57/140 BY,
140 G, 144, 162, 160; 28/72.17; 152/359, 358

[56] References Cited
UNITED STATES PATENTS

| 2,313,058 | 3/1943 | Francis, Jr. ................... | 57/140 G |
| 2,448,782 | 9/1948 | Davis ........................... | 57/140 G |
| 2,468,304 | 4/1949 | Musselman .................... | 152/359 UX |
| 2,475,083 | 7/1949 | Davis ........................... | 57/140 G |
| 2,656,585 | 10/1953 | Jackson ........................ | 28/72.17 X |
| 2,755,214 | 7/1956 | Lyons et al. ................... | 152/359 X |
| 3,455,100 | 7/1969 | Sidles et al. ................... | 57/140 X |
| 3,486,546 | 12/1969 | Sidles et al. ................... | 57/144 X |

Primary Examiner—John Petrakes
Attorneys—Staelin & Overman and Paul F. Stutz

ABSTRACT: Organic and glass filaments, yarns and/or strands are combined, with the organic component as the core and the glass component as the overwrap, followed by a treatment which causes the organic to shrink, causing spaced portions of the glass component to move or to tend to more radially outwardly with respect to the longitudinal axis of the combined structure and whereby, when the combined structure is in an elastomeric matrix, the region of the matrix contiguous to the organic component is in a state of compression while the glass component exhibits greater anchoring potential with the elastomeric matrix.

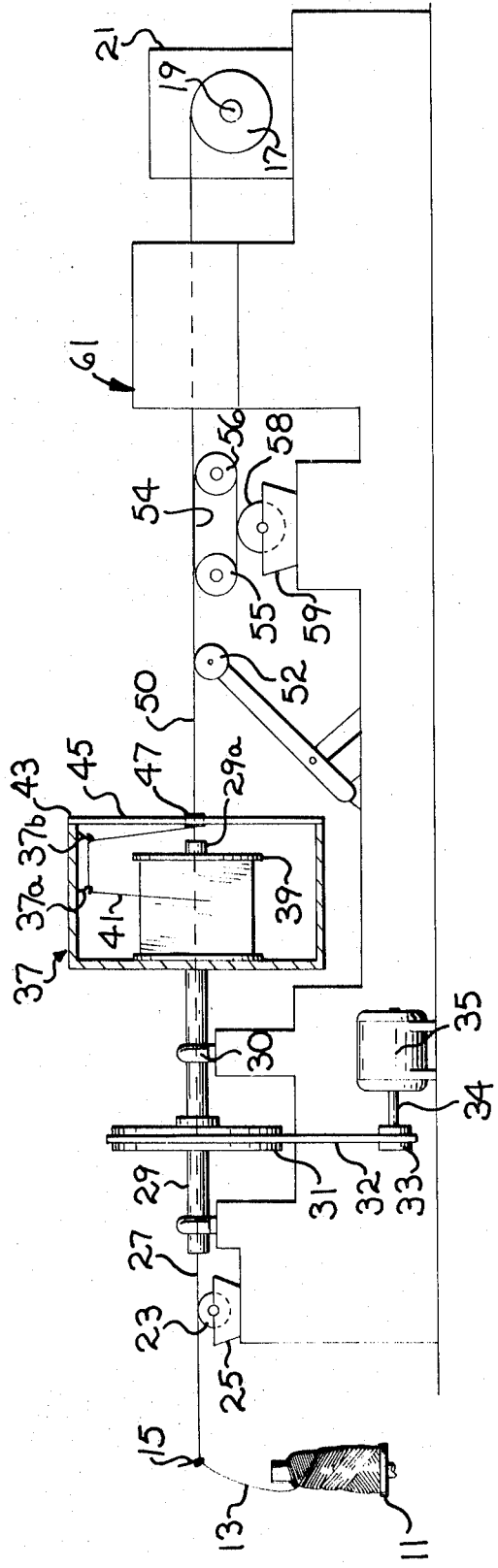
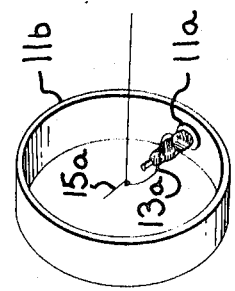
FIG. 1
FIG. 2
INVENTOR.
ALFRED MARZOCCHI

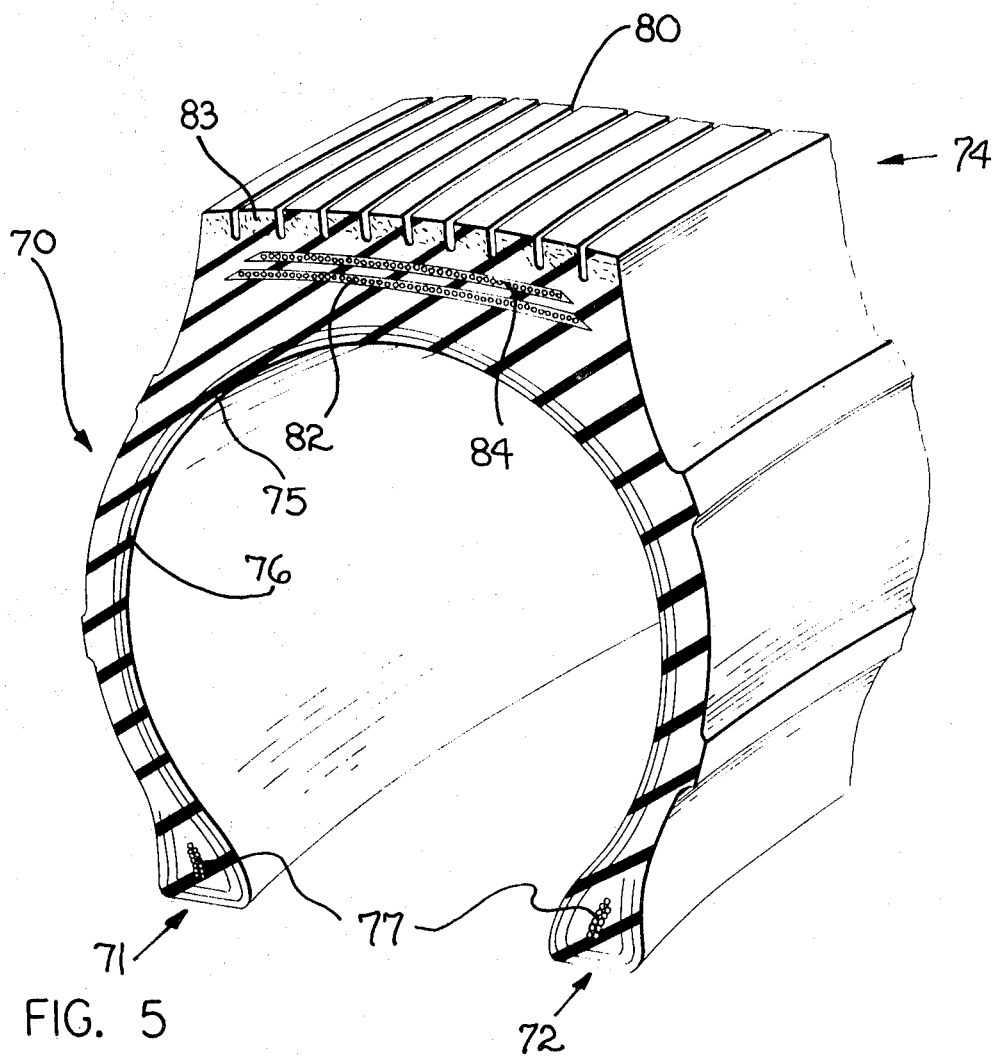
FIG. 5
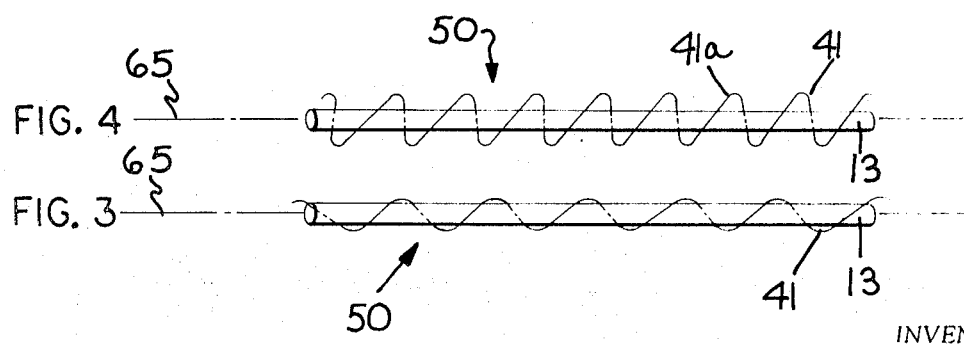
FIG. 4
FIG. 3
INVENTOR.
ALFRED MARZOCCHI
BY
ATTORNEYS

MULTIFILAMENT REINFORCEMENT YARNS AND ARTICLES CONTAINING SAME

Yarns and cord structures formed of twisted-together filaments of a variety of materials have been employed in and as interior reinforcements for rubberlike elastomeric bodies such as tires, industrial belts of all kinds and other mechanical rubber goods. These materials include cotton, rayon, the polyamides such as nylon, the polyesters such as Dacron, polypropylene; even fine steel wire and, more recently, glass. These materials all possess inherent advantages in terms of their properties in the application under consideration and, as well, these materials have certain disadvantageous properties. The particular attributes and, as well, the shortcomings of the natural occurring and synthetic materials are well known in the art and will not be gone into in detail herein. Glass as a candidate reinforcement for annular bodies possesses a number of desirable properties. For example, a glass filament (a) possesses essentially 100 percent elasticity, (b) demonstrates essentially no yield under stress, (c) demonstrates excellent dimensional stability and (d) is virtually immune to change in atmospheric conditions, principally moisture and, as well, heat. On the other hand, glass is quite stiff when compared to the conventional organics. Numerically, glass has a stiffness of 322 grams per denier (g.p.d.) while nylon ranges from 18-23 g.p.d., polyesters range from 11-21 g.p.d., the acrylics such as acrilan and Orlon range from 7-10 g.p.d., viscose rayon varies from 11 to about 25 g.p.d. The low breaking elongation of glass frequently presents some problems. Thus, the value of glass is 3-4 percent whereas the polyesters range from 19-30 percent, nylon ranges from 16-40 percent, the acrylics from 36-40 percent, viscose rayon from 9-30 percent. Glass also has a high specific gravity measuring 2.54 compared to 1.14 for nylon, 1.5 for rayon and from 1.22 to 1.38 for the polyesters such as Kodel and Dacron. Additionally, glass has a toughness value of 0.07 on a denier basis compared to nylon's 0.75, rayon's 0.20, Dacron polyesters' 0.5 and acrylic Orlon's 0.4. It can be appreciated from the foregoing that any contemplation of the use of glass as a reinforcement must proceed on the basis of a consideration of these quite different properties entailing therefore the determination of the ideal geometric, e.g., spatial, location of the glass within the body, either alone or in combination with other materials, in order to achieve an effective and, in some ways, a superior reinforcement.

It is an object of the present invention to provide a novel scheme of reinforcement for annular bodies such as tires and all kinds of industrial belts.

It is a particular object of the present invention to provide a reinforcement system which employs twisted-together subelements such as glass and, as well, the other candidate reinforcement materials combined in such fashion and in conjunction with other features of arrangement as provide a maximization in achievement of the inherent desirable properties of the material and, as well, a minimization of the not-so-desirable properties of the candidate reinforcement material.

It is still another object of the present invention to provide combination or composite cord structures which are capable of novel employment as a reinforcement material for elastomeric products, particularly those which have utility in applications subjecting the product to dynamic stress.

It is yet another object of the present invention to provide a novel method of combining differing filament strand and yarn materials into a composite structure of unique capabilities.

It is a particular object of the present invention to provide a tire construction featuring novel composite cord structures as a reinforcement material.

It is still another important object of the present invention to provide a tire construction featuring the composite cord structure of the invention in the form of relatively short lengths randomly distributed through the matrix.

It is yet another object of the present invention to provide a vulcanized elastomeric product containing interiorly thereof a length of a composite structure exhibiting regions of compression proximate the reinforcement composite, while at the same time said reinforcement structure exhibits improved physical anchoring to the vulcanized elastomeric matrix.

The foregoing, as well as other objects of the present invention, will become apparent to those skilled in the art from the following detailed description taken in conjunction with the annexed sheets of drawings on which there are illustrated several embodiments of the method of the invention and several variant embodiments of products in accordance with this essentially unitary invention.

IN THE DRAWINGS

FIG. 1 is a side elevation view illustrating schematically an array of apparatus of utility in producing the composite structure of the present invention;

FIG. 2 is a three-quarter perspective view of an alternative feed arrangement for the apparatus of FIG. 1 in accordance with the present invention;

FIG. 3 is a side elevation view schematically illustrating a composite structure at an intermediate state of its production in accordance with the present invention;

FIG. 4 is a side elevation view schematically illustrating the composite structure in its final form; and FIG. 5 is a three-quarter perspective view, partially broken away, showing the interior reinforcement of a pneumatic tire embodying features of reinforcement in accordance with the present invention.

In its simplest form, the present invention envisions a composite yarn or cord composed of subelements of differing properties, particularly differing stretch or shrink properties; the composite structure undergoing a change in terms of the surrounding elastomeric matrix whereby the interfacial regions surrounding the reinforcement is in compression while the essentially nonshrinkable reinforcement material exhibits a spatial reorientation within the matrix leading to an improvement in the anchoring of the composite structure in the elastomeric vulcanized product.

Referring now more specifically to the drawings, there is disclosed in FIG. 1 a method of producing the multielement structure. The reference numeral 11 identifies a rotatable supply spool from which is unreeled a continuous length 13 of a continuous organic yarn. The rotation of the spool 11 may be controlled by suitable tensioning devices. The organic strand proceeds through an eyelet 15 and then horizontally through a series of stations, terminating in a windup spool 17 mounted coaxially on shaft 19 driven by a motor located in housing 21 (the motor not being shown).

The organic strand may be composed of a plurality of the same or different organic filaments and, in proceeding through the stations, passes tangentially over a roller 23 rotating in a pan 25 containing an impregnant material as will be described. The strand, now designated 27, passes through a tubular member 29 rotatably mounted in spaced journals 30. The tubular member 29 is rotatable in these journals by means of a sheave 31 mounted thereon rotated by a belt 32 which in turn is rotated via a sheave 33 mounted on shaft 34 of motor 35 suitably connected to a source of electric current. A bell housing 37 is mounted at the downstream end of the tubular member 29 and rotates therewith. Within the bell housing, a supply spool 39 is mounted coaxially and rotatably on the tubular member 29. The supply spool 39 contains an endless supply of glass yarn 41 which is drawn therefrom as the tubular shaft 29 and the bell housing 37 rotate. The bell housing terminates in an outer annular lip 43 on which is mounted a transverse bar 45 having mounted centrally thereof a friction-free guide bearing 47. The yarn 27, in proceeding through the hollow tubular member 29, exits from the downstream extremity thereof 29a and through the guide 47, while at the same time the glass strand 41 is wrapped thereabout as it is drawn through the eyelets 37a and 37b mounted on the innner surface of the bell housing and thence convergingly about the organic yarn whence both pass through the guide 47. The glass strand 41 by means of this arrangement is wrapped in spiral disposition about the organic yarn; the number of wraps per unit length being determined by the speed of rotation of the takeup roller 17 and the rotation of the bell housing 37. The composite strand identified by the reference numeral 50 next passes over a support roller 52 and thence across the top course of a conveyor belt 54 carried by spaced rollers 55 and 56; one of which is driven by appropriate means. The belt 54 in its lower course passes into contact with a roller 58 mounted for rotation in a pan 59 containing a supply of a suitable impregnant material as described hereinafter. By reason of the foregoing arrangement, an amount of impregnant is transferred to the composite yarn as it passes in the manner described. The composite yarn then passes through a suitable drying oven 61 from which it emerges and is wrapped about the takeup roller 17. The oven can serve to heat the organic to shrink same in accordance with one embodiment of the present invention.

Appropriate wiping dies may be employed, as well as suitable tensioning devices. Also, a traversing mechanism is usually employed to arrange the composite strand material on the roller 17 in repeating side-by-side courses.

In accordance with an alternative embodiment of the present invention, a feed arrangement as illustrated in FIG. 2 may be utilized in connection with the furnishing of the supply of continuous organic yarn. As can be seen, the feed spool 11a containing a supply of the organic yarn 13a is mounted on the inside surface of an annular collar 11b which is suitably connected to an arrangement for rotating same as the strand 13 is pulled from the spool 11a, passes through the eyelet 15a and then proceeds horizontally downstream past the stations otherwise as described in FIG. 1.

The composite yarn in an intermediate stage in accordance with the method of FIG. 1 is illustrated schematically in FIG. 3 wherein the reference numeral 13 identifies the essentially elongate core formed of the organic component, usually a plurality of filaments. The reference numeral 41 identifies the glass component in the form of a spiral wrap extended repeatedly about the core. The reference numeral 50 identifies the composite of these two components. As can be seen, the spiral disposition of the glass component is regular and is in relative surface abutment in its repeating path about the organic core.

Referring now to FIG. 4, there is disclosed again schematically the composite structure in its ultimate form illustrating the physical relationship of the organic core and the glass overwrap 41 in accordance with the present invention. As illustrated in FIG. 4, the organic core 13 has shrunk due to the particular stimuli to which the composite has been subjected. As a consequence of the shrinking, the spiral overwrap of glass undergoes two changes with respect to the organic core. The period of the spiral (the distance between repeating segments of the spiral) is closer together, while the amplitude, as it were, of the spiral is greater; that is, spaced portions of the glass overwrap have moved or tend to move radially away from the longitudinal axis 65. In accordance with one embodiment of the present invention, the cord or composite structure 50 as shown in FIG. 3 is converted to the structure 50 of FIG. 4 by means of a treatment while the composite yarn exists as an elongate material. This may take the form of a heat treatment via the oven 61 or it may take the form of a chemical treatment in lieu of the oven 61 as by sending the composite yarn through a suitable bath (not illustrated). The chemical treatment also may be imparted to the composite structure by immersing the entire package wound on the spool 17 into a suitable dipped bath, followed by a drying. Other stimuli may be employed, depending upon the properties of the selected organic yarn for the core material. For example, an exposure to a particular wavelength of energy or bombardment with a suitable atomic particle may be effective to produce a shrinkage of the particular organic core selected.

In a particularly preferred embodiment of the present invention, the composite structure 50 of FIG. 3 is appropriately embedded into tn elastomeric matrix, usually as a reinforcement material, followed by a vulcanization involving a temperature in the neighborhood of 250° F. -400° F.; which temperature will cure the rubber and also operate as the stimulus effecting shrinkage of the organic core and the physical shifting or tendency to shift of the glass component as schematically illustrated in FIG. 4. In accordance with this embodiment, a particularly preferred and desirable result is achieved, namely, that the region of rubber in immediate surrounding relationship with the core in the spaces or voids not covered by the glass overwraps due to the shrinkage will be put in a state of compression. This will occur essentially simultaneously or concurrently with the shift in the glass. The glass, considered basically, of course, is a rod or column and, of course, tends to retain its shape. Now being in the form of a spiral overwrap, which defines a coil spring, the shrinking of the core will result in the spring (coiled) moving to the configuration as illustrated in FIG. 4, creating, in effect, outer regions identified by the reference numeral 41a, providing, considered from a physical point of view, regions available for anchoring relationship with the surrounding elastomeric matrix and particularly in those regions spaced radially outward from the region of compression as described just previously herein.

Referring now more particularly to FIG. 5, there is disclosed a pneumatic tire 70 which is composed of spaced beads 71 and 72 and a principal carcass 73 extending toroidally between the beads 71 and 72; the toroidal carcass 73 carrying at the outer periphery thereof a tread 74. In the tire 70, the reference numerals 75 and 76 identify carcass plies extending from bead to bead; the extremities thereof being wrapped about the bead wires 77 situated in each of the spaced heads 71 and 72 in accordance with conventional practice. The carcass plies 75 and 76 are composed of mutually parallel cords 50 as described and characterized in connection with the description of FIGS. 3 and 4. The cords making up the carcass plies are arranged in mutually parallel relationship and embedded in an elastomeric matrix via a calendering technique, following which they are cut on a bias in such fashion that in the tire-building process the cords are situated on a building drum in angularly opposite relationship, usually such that the individual cords in the adjacent plies describe an angle of anywhere from 25° to 40° with the peripheral centerline of the tire which corresponds with the centermost groove identified in FIG. 5 by reference numeral 80.

In accordance with a further embodiment of the present invention, the tire 70 includes a pair of belt plies 82 and 84 situated in the crown of the tire above the carcass plies, at the same time beneath the tread and in generally parallel disposition with the tread contour. The belt plies extend from approximately shoulder to shoulder with the uppermost tread ply 84 of somewhat less lateral extent than the lower ply 82. The belt The extend in a peripheral direction all the way about the tire. The belt or tread plies, sometimes referred to as breaker strips, in accordance with this embodiment of the present invention are in each case formed of mutually parallel yarn structures 50 as described in connection with 50 3 and 4. The individual cords in the belt ply 82 are in mutually parallel relationship and extend from lateral margin to lateral margin in a bias fashion with respect to the peripheral centerline. The individual cord structures in the belt ply 84 are of opposite inclination but of essentially the same degree of angular relationship with the peripheral centerline. In the case of the tread plies, the angular relationship with the peripheral centerline is somewhat less than the angular relationship of the cords in the carcass plies with the peripheral centerline. Thus, an angular relationship of from about 15° to about 30° is employed. As in the case of the carcass plies, the belt plies are fabricated by arranging a plurality of the cords in mutually parallel relationship and embedding them in an elastomeric matrix. Following this, the formed sheet is cut into belt configuration in bias arrangement as to the cords such that the cords proceed across the crown region at an angle with the peripheral centerline.

The plies employing cords 50 (FIG. 3) in the assembly of the "green" tire will upon vulcanization exhibit a transformation to the configuration of FIG. 4, thereby increasing the effective bulk and anchoring potential with the elastomeric matrix.

In accordance with another and further embodiment of the present invention, the tire construction 70 includes in the tread region, in random orientation, a plurality of short lengths of composite cord structure 50 in accordance with the embodiment shown in FIG. 4. The short lengths in the tread region are identified by the reference numeral 83. The elastomeric material making up the tread is and can be formed by mixing an amount of the basic elastomer on a mill and sometime during the mixing cycle an amount of chopped lengths of the cord 50 of FIG. 3 is added to the material on the mill. Generally, too long a mixing time is not desired since it is desirable that at least a substantial proportion of the lengths desirably maintain their composite cord identity as opposed to being separated into individual glass and individual organic components as otherwise occurs due to extended milling time. The composite cord or yarn structures 83 may range in amount from about 2 to 3 to about 50 percent by weight of the elastomeric matrix. The chopped structures 83 added to the mill mix of the elastomer forming the tread stock may range anywhere from about ⅛ to several inches in length, recognizing that there will be some size degradation due to the action in the mill. It will be appreciated that the chopped structures 83 can be added to the tread stock just prior to or in the course of extrusion into the camelback configuration viewed in cross section.

The composite cord construction exhibiting the transformation properties as described in connection with FIGS. 3 and 4 is ideal in the tread region since the cord, by reason of the shrinking, tends to induce in the surrounding matrix a condition of compression. Rubber in compression, of course, is strongest from the standpoint of cut through, abrasion, etc. At the same time, the spaced regions of glass extending more extensively radially outwardly from the axis tend to give a more anchored relationship between the composite cord and the matrix, whereby the elastomer component of the vulcanized tread stock is more stabilized, leading to a reduction in tread movement, e.g., squirming, under dynamic load conditions as otherwise occurs in conventionally reinforced tread stock.

The glass strand overwrap 14 carried on the supply spool 39 is desirably treated prior to being combined with the organic core in order to provide a protection of the individual glass filament making up the strand or yarn 41. This treatment is performed on the individual filaments as they are collectively drawn from a multiorifice platinum bushing containing molten glass. For example, a bushing of platinum and containing molten glass has a bottom wall containing plurality, e.g., 204 or 408 or more, of individual orifices. From each of these orifices, a single glass filament is pulled by a winder therebelow which results in the glass being attenuated into extremely fine diameter. The plurality of filaments from a bushing are then drawn together into a common strand just prior to being wound on the spool. The treatment involves spraying the filaments as they are being drawn together with a liquid containing an anchoring agent, for example, an amino silane, such as gamma-aminopropyltriethoxy silane; a mercapto substituted organoalkyoxy silane, such as gamma-glycidoxypropyltrimethoxy silane; or a carboxyl group and/or unsaturated group containing silane, such as gamma-methacryloxypropyltrimethoxy silane. A Werner-type compound complexed to contain an amino, a carboxyl or other active hydrogen containing organic group may be used as the anchoring agent. A typical size treatment composition for the glass filaments is composed of 0.5–2.0 percent by weight of gamma-aminopropyltriethoxy silane, 0.3–0.6 percent by weight of a lubricant and the remainder water. Such a strand contained on the package is usually combined with a plurality of like strands to form an ultimate yarn suitable for use in the present invention. This yarn may be impregnated before use in the method of the present invention or impregnation may be accomplished in the roller applicator 23–25 of FIG. 1 or via the applicator 54–58 after the organic and glass components have been combined together.

A suitable impregnant for use in either of these application stations is composed of 60–40 parts by weight of a 38 percent dispersed solids system including a butadiene-styrene-vinyl pyridine terpolymer latex, a butadiene styrene latex and a resorcinol-formaldehyde resin; all dispersed in 39 parts by weight of water. A commercially available product which has been employed as an impregnant bath in the manufacture of combination yarn materials is marketed by Uniroyal under the trade name "LOTOL 5440."

The organic core yarn 13 may be selected from a variety of the candidate organic materials, having in mind the particular stimulus which will be effected to cause a contraction or shrinking.

Olefin fibers such as isotactic polypropylene exhibits 40percent shrinkage at 165° F., and 10–15percent shrinkage at 212° F. High-density polyethylene exhibits 3–5percent shrinkage at 165°–175° F., and 8–12percent shrinkage at 212° F. Conventional low-density polyethylene exhibits 5–8percent shrinkage at 165° F. and 50–60percent shrinkage at 212° F. Certain of the polyester fibers exhibit a small amount of shrinkage and therefore would be suitable under certain conditions. Acrilan, an acrylic resin fiber, exhibits 5 percent shrinkage at 487° F. Many of the polyamide (nylon) fibers exhibit shrinkage on heating or exposure to certain chemicals as do the polyurethane materials. Reference to available literature on the properties of various organic fibers will reveal readily to those skilled in the art candidate materials which will exhibit a shrinking or contraction phenomena upon exposure to a given stimuli.

It is within the purview of the present invention to treat the organic material by a stretching prior to combining with the glass. In this fashion, the scope of materials usable becomes broader since given materials may not have any particular contraction capabilities but they may have, and certain of them do have, stretch capabilities coupled with elastic recovery. In this manner, in accordance with this embodiment therefore, the material would be stretched and then combined with the glass while in the elongated state. Thereafter, elastic recovery would, in effect, shrink the organic core, causing the overwrap of glass to undergo the transformation illustrated in FIGS. 3 and 4.

Other modifications and variance in techniques will be suggested to those skilled in the art from the foregoing detailed description and all such modifications and variance in technique are intended to be included within the scope of the present invention unless clearly violative of the language of the appended claims.

I claim:

1. A continuous multielement cord structure comprising:
   an elongate flexible core member formed of a plurality of organic filaments which are subject to axial contraction upon exposure to a given stimulus,
   a surrounding sheath arranged in spiral, contacting disposition with respect to said core, said surrounding sheath being formed of a plurality of continuous glass filaments, and
   a vulcanizable elastomeric impregnant carried in and by said structure, said cord structure being adapted for interior reinforcement of vulcanized rubber bodies wherein said organic core, being shorter after vulcanization than before vulcanization, causes the rubber surrounding said core to be in a state of compression.

2. The cord structure as claimed in claim 1, wherein said glass filaments exhibit spatial reorientation during vulcanization, thereby improving anchoring of the cord in said bodies.

3. The cord structure as claimed in claim 2, wherein said core material is a polyamide.

4. The cord structure as claimed in claim 2, wherein said core material is polypropylene.

5. The cord structure as claimed in claim 2, wherein said core material is a polyurethane.

6. The cord structure as claimed in claim 2, wherein said core material is an acrylic material.

7. A vulcanized rubber body comprising a principal elastomeric matrix and disposed interiorly thereof an elongate cord reinforcement member, said cord member including a central core formed essentially of a plurality of organic filaments and a surrounding sheath formed of a spiral wound length of a yarn composed of mineral filaments, said core of organic filaments being shorter in the vulcanized state than when it is in the unvulcanized state by reason of the heat of vulcanization, whereby said elastomeric matrix in the region immediately surrounding said central core is in a state of compression.

8. The body as claimed in claim 7, wherein the amplitude of the spiral defined by said sheath is larger when the said matrix is in the vulcanized state than when said matrix is in the unvulcanized state.

9. The body as claimed in claim 8, wherein said mineral filaments are continuous glass filaments.

10. In a vulcanized elastomeric tire construction including a toroidal carcass inclusive of a principal elastomeric matrix, means connected thereto for securement to a wheel and a ground-engaging tread carried at the crown region of said carcass; the improvement wherein said matrix has distributed therethrough, in preselected regions, a plurality of discrete, relatively short lengths of a composite cord structure comprising an elongate flexible core formed of a material which has contracted axially during vulcanization and a surrounding sheath arranged in spiral, contacting disposition with respect to said core, said surrounding sheath being formed of mineral filaments, said contraction causing the elastomeric matrix immediately surrounding said core to be in a state of compression.

11. The tire construction as claimed in claim 10, wherein said lengths are located principally in the tread region whereby said tread exhibits stability and resistance to abrasion and cut through.

12. In an elastomeric tire construction including a toroidal carcass inclusive of a principal elastomeric matrix, means connected thereto for securement to a wheel and a ground-engaging tread carried at the crown region of said carcass; the improvement which comprises cord reinforcement disposed interiorly thereof, said cord including a central core formed of organic material, and a surrounding sheath formed of a spiral wound length of a yarn composed of mineral filaments, said core being shorter when the elastomeric matrix is in the vulcanized state than when it is in the unvulcanized state, whereby the region of said elastomeric matrix immediately surrounding the central core is in a state of compression.

13. A vulcanized rubber body comprising a principal elastomeric matrix and distributed interiorly therethrough a plurality of discrete relatively short lengths of a composite cord structure comprising an elongate flexible core formed of a material which has contracted axially during vulcanization and a surrounding sheath arranged in spiral, contacting disposition with respect to said core, said surrounding sheath being formed of mineral filaments, said contraction causing the elastomeric matrix immediately surrounding said core to be in a state of compression.

14. A reinforcement member adapted for incorporation into a vulcanizable elastomeric stock material which is desirably formed into a vulcanized rubber product of improved properties, said member constituting a multielement cord varying from ⅛ inch to several inches in length, said cord member comprising:

a flexible core formed of a plurality of organic filaments which are subject to axial contraction upon exposure to a given stimulus, such as the heat of vulcanization, a surrounding sheath arranged in spiral contacting disposition with respect to said core, said surrounding sheath being formed of a plurality of continuous glass filaments, and a vulcanizable elastomeric impregnant carried in and by said structure, said organic core being shorter after vulcanization than before vulcanization whereby the rubber surrounding said core is in a state of compression, thereby increasing the strength of said rubber product.

15. A reinforcement member as claimed in claim 14, wherein said glass filaments exhibit spatial reorientation during vulcanization, thereby improving anchoring of the length in the vulcanized product.

* * * * *